Nov. 2, 1926.  
W. H. MUSSEY  
HAND BRAKE MECHANISM  
Filed July 30, 1925  
1,605,268
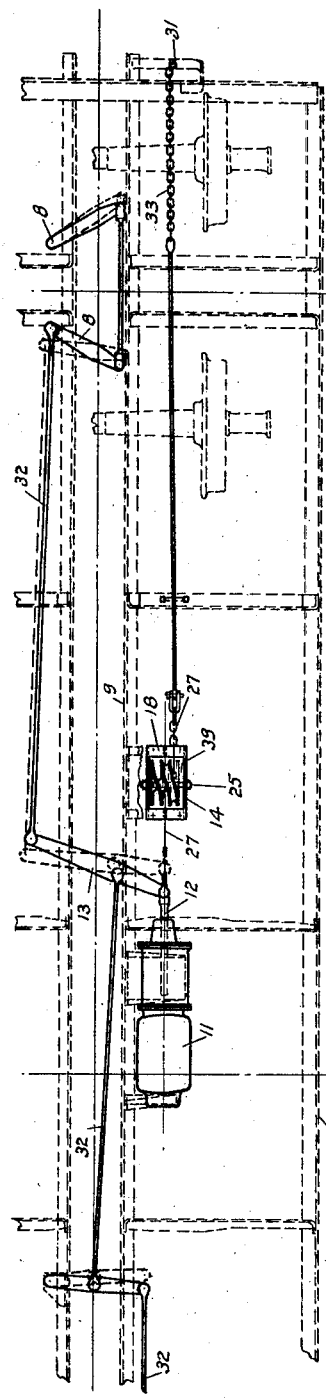
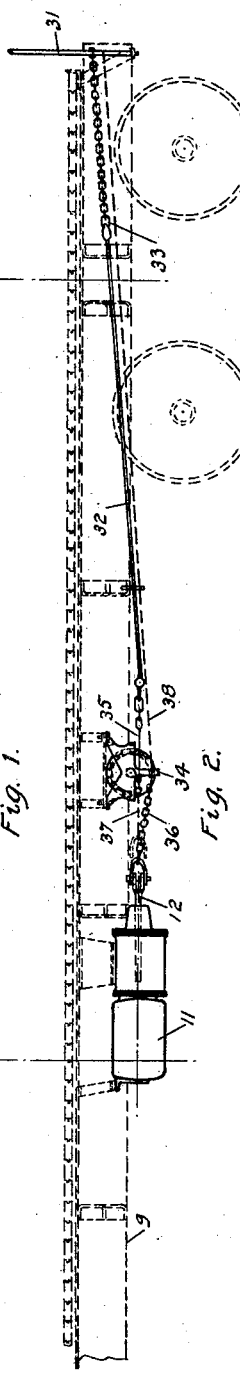
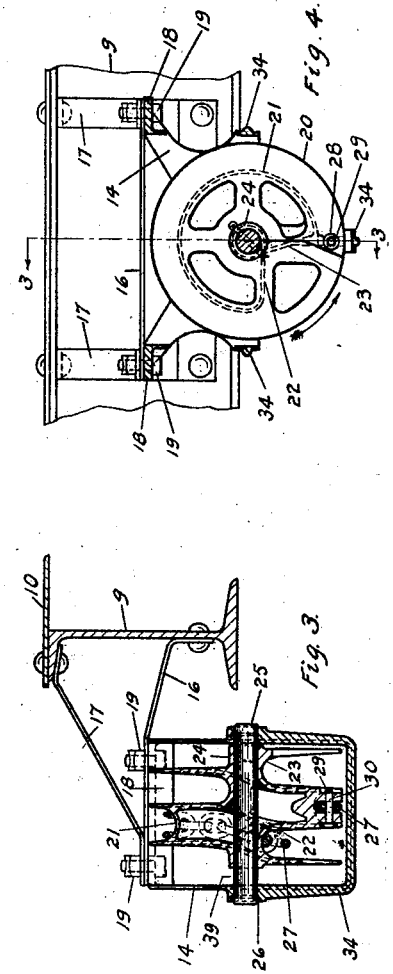
INVENTOR  
William H. Mussey.  
By Oscar Hochberg  
his attorney.

Patented Nov. 2, 1926.

1,605,268

UNITED STATES PATENT OFFICE.

WILLIAM H. MUSSEY, OF CHICAGO, ILLINOIS, ASSIGNOR TO PULLMAN CAR AND MANUFACTURING CORPORATION, OF CHICAGO, ILLINOIS, A CORPORATION OF ILLINOIS.

HAND BRAKE MECHANISM.

Application filed July 30, 1925. Serial No. 47,049.

The invention relates to devices forming part of the hand brake mechanism of railway cars and designed for use in conjunction with the air brake rigging to which it is operatively connected.

An object of the invention is to provide mechanism to take the place of the usual hand brake lever in the brake rigging organization and devised with means for quickly taking up the slack in the rigging with a minimum expenditure of power during the initial stages of the braking operation until the brake shoes have come into contact with the wheels whereupon the maximum power of the mechanism becomes effective.

Another and important object is to so mount the sheave worm of the mechanism that any tendency on the part of the chain winding thereon to climb the worm threads will be overcome and excessive or objectionable lateral movements and angularities in the chain with respect to air brake cylinder and hand brake staff prevented.

In the drawing:—

Fig. 1 is a plan view of a portion of a railway car equipped with a brake arrangement embodying the invention;

Fig. 2 is a side elevation thereof;

Fig. 3 is an enlarged view of the worm in vertical section taken on line 3—3 of Fig. 4 looking in the direction indicated by the arrow; and Fig. 4 is a side elevational view of the worm with portions of the housing broken away to more clearly show the worm construction.

In said drawing, 10 represents the underframe of a railway car equipped with the invention. An air brake cylinder 11 is secured to the underframe and connected to cylinder lever 13 thru the medium of its piston 12 in a well-known manner. Adjacent the air cylinder 11 and positioned approximately at the point occupied by the hand lever heretofore employed, I attach a housing 14, supporting same on the underframe of the car by means of brackets of any approved design, that in the drawing being made up of a base plate 16 extending the full length and width of housing 14 and secured to the center sills 9 of the underframe in conjunction with a plurality of brace bars 17 and connected to the end rails 18 of the housing by bolts 19.

Within housing 14 is mounted a sheave worm 20 having a continuous chain groove 21 terminating in straight hub groove portions 22 and 23 extending from the groove periphery tangentially to the hub 24 of the worm and at an angle to each other for a purpose to be hereinafter described.

The worm 20 is slidably and rotatably mounted upon spindle 25 held in bearings 26 of the housing 14, and its length is preferably proportioned to the distance between the spindle bearings 26 in order to permit sufficient movement of the worm longitudinally of the spindle 25 under the impetus of the winding and unwinding operations of the sheave worm chain 27, as will presently appear. The worm 20 is formed with a chain anchorage 28 at a point intermediate the ends of the chain groove 21 as best shown in Fig. 3, the anchorage being fitted with a pin 29 removably mounted in bearings 30 of the anchorage and passing through a link of chain 27 as illustrated in this figure.

The sheave worm chain 27 is preferably continuous and wound about the worm 20 with its ends extending in opposite directions and operatively secured respectively to cylinder lever 13 and hand brake staff 31, the connection to the brake staff being effected through medium of brake rod 32 and brake chain 33 as shown in Figs. 1 and 2. The chain is held from displacement within chain grooves 21 of the worm by the several cross members 34 of housing 14 disposed as shown in Figs. 3 and 4.

In operation, assuming the parts to be in the brake shoe released position, to bring the shoes into braking contact with the wheels, the brake staff 31 is rotated to cause a pull on chain 27 initially traversing hub groove portion 22 and circumferential groove 21 on the sheave worm. With the chain portion leading to the brake staff at the hub groove position 22 and that portion leading to the cylinder lever 13 at the circumferential groove 21, a relatively slight movement of the brake staff end of chain 27 will cause a correspondingly increased movement of the opposite end of said chain in direct proportion to the difference in the diameters of worm at hub and periphery thereof. With the worm 20 in its normal released position shown in Figs. 2, 3 and 4, a pull on chain 27 will rotate the worm in the direction indicated by the arrow in Fig. 4 whereupon the chain position on worm 20 will have shifted and the relation of its respective ends to brake staff and cylinder lever reversed; that is to say, that portion of chain 27 leading to the cylinder lever and initially occupying the circumferential groove position indicated in Figs. 2 and 3 will have shifted to a position in hub groove 23 at the end of the worm 20, and the portion leading to brake staff 31 originally in hub groove 22 as shown in Fig. 3 will have occupied a position in the circumferential groove 21. It will be evident that in the changed positions of the chain portions connecting the cylinder lever 13 to worm 20 and said worm to the brake staff a relatively small pull on the chain at the circumference of the worm will effect a proportionate increase in the power applied at the hub to the chain portion leading to the cylinder lever 13 and, therefore, to the wheels through brake rods 32 and truck levers 8.

It will be observed that the power initially applied to the worm to obtain maximum speed in the application of the brake shoes to the wheels has been translated into a maximum power applied to the wheels and exerted by the worm. During this translation of initial speed to ultimate power the worm 20 will have rotated approximately 90° from the position indicated in Fig. 4, and the opposite portions of chain 27 will have moved from the full line position indicated at 35 and 36 in Fig. 2 to the dotted line position shown at 37 and 38 and during this movement the cylinder lever 13 and connected parts will have moved to their final positions as shown in dotted lines in Figs. 1 and 2 in which position the brake shoes will have moved into contact with the wheels whereupon continued rotation of worm will cause the required brake shoe pressure to be exerted upon the wheels in the manner above outlined.

It should also be noted that during the winding and unwinding movements of the chain 27 on the worm 20, the worm will move longitudinally of the supporting spindle 25 in response to the winding pressure of the chain within the worm groove 21, such movement being caused by the side-wiping of the chain due to its tendency to climb the worm groove walls. As will be obvious, the worm will yield to the side thrust of the chain and move longitudinally of the spindle 25 a distance corresponding to extent of the shift of the chain on the worm during the chain winding operations, and to that extent the chain portions leading to cylinder lever 13 and brake staff 31 are prevented from assuming excessive angularities with respect to the chain grooves on the worm 20, sufficient clearance being provided for that purpose as indicated at 39 in Figs. 1 and 3.

It will be further noted that the tangential hub groove 22 in the position indicated in Fig. 4 will permit the portion of sheave worm chain 27 leading to the brake staff 31 to assume a position at the hub parallel to said groove, but upon approximately a quarter rotation of said worm as before described the relative angularity of the tangential groove portions 22 and 23 will cause groove 23 to assume a position to the right of the spindle 25 in Fig. 4 corresponding to the original position of groove portion 22 shown at the left of this figure thereby permitting that portion of chain 27 leading to the cylinder lever 13 to assume a position at the hub parallel to groove portion 23 as indicated at 37 in Fig. 2 and for the purposes hereinbefore outlined.

What I claim is:—

1. In hand brake mechanism for cars comprising a sheave worm operatively connected to other elements of the brake organization and having hub portions, straight terminal chain groove portions in tangential relation to said hubs, and an intermediate circumferential groove connecting said terminal groove portions and forming a continuation thereof.

2. In hand brake mechanism for cars comprising a sheave worm operatively connected to other elements of the brake organization and provided with hub end portions, an intermediate circumferential chain groove portion, and straight terminal groove portions in tangential relation to said hubs and forming continuations of said intermediate circumferential groove.

3. In hand brake mechanism, a sheave worm having a circumferential chain groove intermediate its ends, terminal grooves forming extensions of said intermediate groove, and hub end portions on said worm, said terminal grooves having straight groove portions connecting said hubs and circumferential groove.

4. In hand brake mechanism, a sheave worm having end hubs and a circumferential chain groove intermediate said hubs terminating in straight groove portions tangent to said hubs, said terminal groove portions being arranged at an angle with respect to each other.

5. In a car brake arrangement, a hand brake mechanism comprising a housing, a power and speed multiplying sheave worm rotatably mounted in said housing and having straight relatively angular terminal grooves, and oppositely extending operating connections, said grooves becoming effective upon rotation of said worm to respectively traverse said connections.

In witness whereof I have hereto set my hand this 27th day of July, 1925.

WILLIAM H. MUSSEY.